May 16, 1939.  D. ROBERTS ET AL  2,158,086

METHOD OF MANUFACTURING CELLULAR RUBBER SHEETS

Filed March 27, 1936  2 Sheets-Sheet 1

INVENTORS
Dudley Roberts
James S. Reid

BY Samuel Ostrolenk
ATTORNEY.

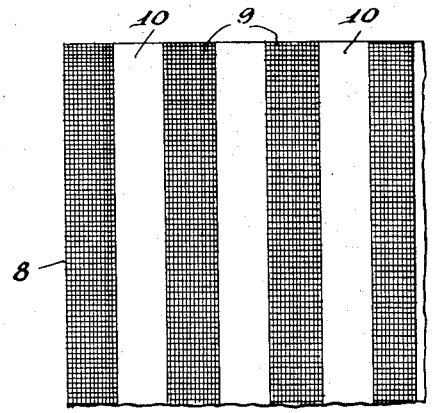
Fig. 5
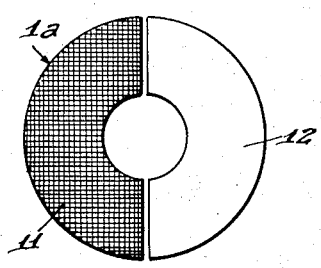
Fig. 6
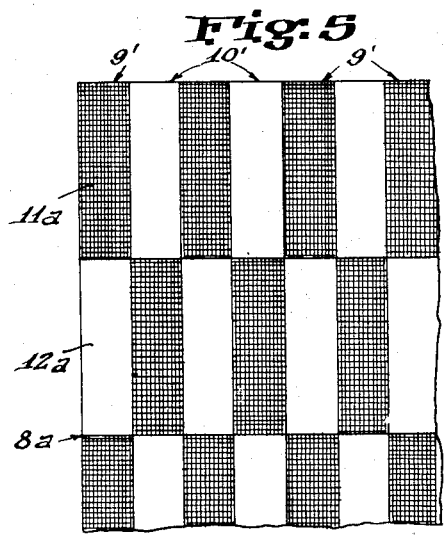
Fig. 7
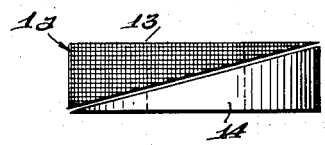
Fig. 8
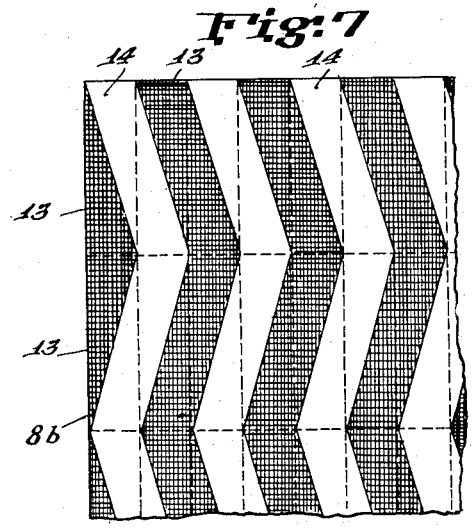
Fig. 10
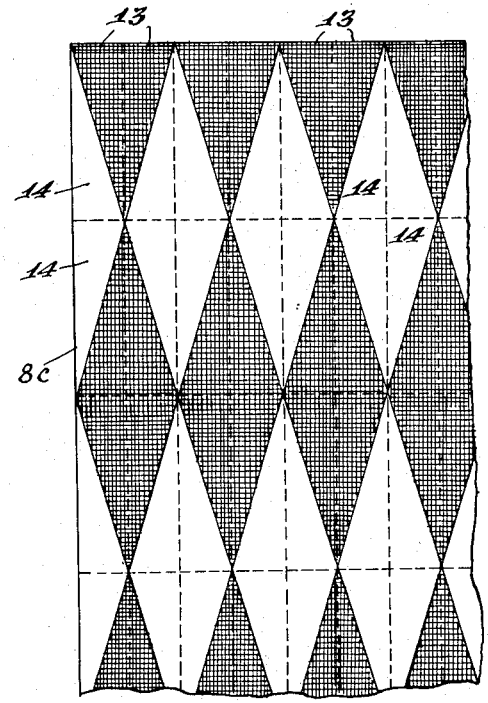
INVENTORS
Dudley Roberts
James S. Reid
BY
ATTORNEY.

Patented May 16, 1939

2,158,086

UNITED STATES PATENT OFFICE 2,158,086

METHOD OF MANUFACTURING CELLULAR RUBBER SHEETS

Dudley Roberts, New York, N. Y., and James S. Reid, Cleveland, Ohio, assignors to Rubatex Products, Inc., New York, N. Y., a corporation of Delaware Application March 27, 1936, Serial No. 71,238

8 Claims. (Cl. 18—53)

This invention relates to cellular rubber sheets and more particularly relates to novel methods of manufacturing gas expanded rubber in long continuous sheet form.

The vulcanization of thin sheets of rubber is a relatively expensive process, particularly when the sheets are very long. The prior methods utilized a long hydraulic press and vulcanized a long sheet of rubber in successive sections. Ordinarily, a hump or hard area results at the adjacent section ends where the rubber is necessarily vulcanized twice. The long hydraulic press is an extremely expensive machine. Such a continuous rubber sheet process is, accordingly, unsatisfactory both economically and practically if a homogeneous long continuous sheet is required.

In the manufacture of long sheets of sponge rubber the generally used prior method was to produce thick slabs 1½ inches thick and 10 feet long and 3 or 4 feet wide and to pass these slabs through a slitting machine to produce thin sheets of rubber, for example ⅛ or ¼ inch thick. Such a method limited the size or length of rubber sheets.

Our invention contemplates the manufacture of long continuous homogeneous sheets of gas expanded rubber of any desired thickness. The gas expanded rubber is of relatively low density and may have an individual cellular structure or may be the well-known sponge rubber. A process for manufacturing cellular gas expanded rubber is the basis of the United States Patent No. 1,905,269, dated April 25, 1933, to Denton and of the copending United States application Serial No. 717,550, filed March 27, 1934, assigned to the same company as is the present invention.

In accordance with our present invention a cylinder or large roll of cellular rubber is formed and subjected to a cutting operation whereby a continuous sheet of the desired thickness is "shaved" from the cylinder. Such a shaving process is described in United States Patent No. 1,951,853 to Walsh, patented March 20, 1934, and is well-known in the mechanical arts. The primary object of our present invention is to provide novel methods of and apparatus for manufacturing a homogeneous cylinder or roll of cellular rubber.

It is well known in the cellular rubber art that the gas of the autoclave will only penetrate a small distance, for example, ⅝ inch, in about five hours of gassing. If a longer period of gassing is used, the outer surfaces of the rubber dough will be subjected to a higher degree of heat than the inside of the mass if it is too thick.

Accordingly, another object of our invention is to provide novel methods of and apparatus for homogeneously gassing rubber dough to be used for forming long cylinders thereof.

We contemplate preparing thin cylindrical slabs of gassed semi-vulcanized rubber and building up a relatively long cylinder or roll of rubber by cementing a plurality of slabs together. The large roll or cylinder is then completely cured in an open hot air cure to produce the roll of expanded rubber to be pared or "shaved" into a continuous sheet.

By using different colored slabs in building up the cylinder of cellular rubber and also by cutting the slabs diagonally or in other readily varied forms, sheets of rubber of interesting and pleasing appearance are also manufactured in accordance with our present invention.

It is, accordingly, a further object of our invention to provide rubber sheets of vari-colored design.

These and other objects of our invention will become evident from the following description taken in connection with the drawings, in which.

Figures 5, 7, 9, and 10 are illustrations of the vari-colored design effects in the rubber sheets produced in accordance with our present invention;

Figures 6 and 8 are schematic illustrations of the cutting of the segments used in building up the rubber cylinder for producing the vari-colored sheets.

In carrying out our invention, the following ingredients compounded in the indicated proportions by weight may be used for the rubber dough:

| | Pounds | Ounces |
|---|---|---|
| Smoked rubber sheets | 50 | 0 |
| Zinc oxide | 3 | 7 |
| Whiting | 15 | 0 |
| Light calcined magnesia | 8 | 0 |
| Sulphur | 1 | 0 |
| Carbon black | 1 | 0 |
| Paraffin wax | 1 | 8 |
| Agerite powder | | 10 |
| Heliozone | | 4 |
| Diphenylguanidine | | 5 |
| Captax | | 1¾ |

Reasonable changes in these proportions or in the specified components are entirely feasible. The ingredients are individually mixed on the mill in a manner well known in the art of rubber compounding. The individual sheets of rubber are masticated or softened into a soft mass by masticating rollers which are heated to a temperature of 150° F. The preliminary stages for preparing the rubber dough are described in the Denton patent and the application referred to hereinabove.

Figure 1:
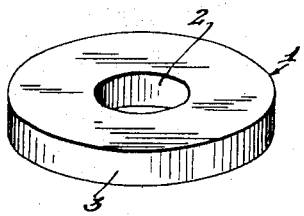
Figure 1 is a perspective view of an elemental slab of rubber dough before gassing.

Figure 1 is a perspective illustration of the slabs of rubber dough which are individually gassed in the autoclave. The rubber dough is formed into the cylindrical slab 1 having a hollow core. Slab 1 is preferably not thicker than ¾ to 1 inch. The annular thickness, namely, the distance between the inner surface 2 and the outer surface 3 of slab 1 is preferably not over 2 inches. These dimensions of slab 1 are specified in order to provide for homogeneous gassing and heating of the individual slabs in the autoclave. The diameter of slab 1 is not limited. However, it is the annular thickness as well as the slab thickness which determines the depth which the inert gas and heat must penetrate from the exposed surfaces.

Figure 2:
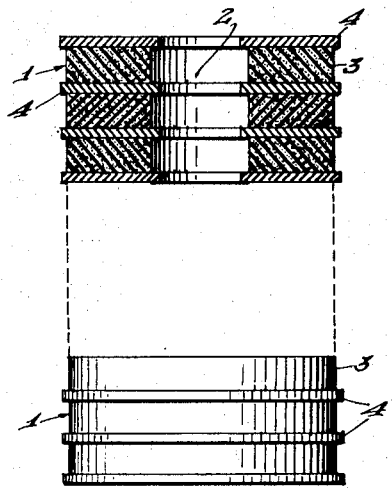
Figure 2 is a partial sectional elevation of the gassing stage assembly in accordance with our present invention.

The slabs of rubber dough 1 are piled upon each other as illustrated in Figure 2, with metallic disk separators 4. The metallic separators 4 each have a central hole to correspond to the hole in the rubber dough slabs 1 to permit the access of gas and heat through the central core of the assembly illustrated in Figure 2 when placed in the autoclave. The separators 4 are preferably made of metal in order to readily conduct heat around the slabs during the semi-curing stage in the autoclave.

The assembled slabs 1 and disks 4 of Figure 2 are placed in a container which is in turn inserted in an autoclave, as described in the Denton patent, for example. Nitrogen is admitted at a suitable pressure and steam is passed through the autoclave coils to heat the contents to about 113° centigrade at a gaseous pressure of the order of 200 atmospheres after the air therein has been extracted to a vacuum of about five inches of mercury. A can container is used to limit the expansion of the rubber dough within the gassing chamber when the gas pressure is released at the end of the gassing stage. The contents of the autoclave are removed in a gas impregnated partially expanded and partially vulcanized stage.

Figure 3:
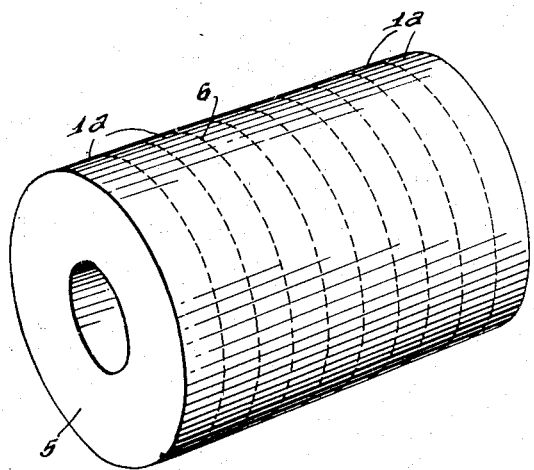
Figure 3 is a perspective view of the built up cylinder of cellular rubber.

When the slabs 1 are released from the can container they will expand to about six times their original volume. A cylindrical roll 5 is then formed of the expanded slabs 1a as illustrated in Figure 3. A suitable cement is preferably used to join the expanded slabs 1a to form the hollow cylinder 5. The slabs 1a are coated with cement and pressed together. Dotted lines 6 indicate the adjacent edges of the slabs 1a of the built-up cylinder 5. The length of the rubber cylinder 5 will correspond to the width of the rubber sheet to be manufactured.

The partially cured rubber cylinder 5 is preferably completely cured in the well-known open-air cure. We have encountered no difficulties in the final curing stage which is facilitated by the hollow central core. Although an appreciable time may be necessary for the heat to permeate a large diameter mass, the complete vulcanization depends upon the amount of sulphur desired and the amount of accelerator used. A homogeneous curing and final expansion of the cylinder 5 will be effected. The slabs 1a are completely welded together to form a homogeneous hollow cylinder or roll of cellular rubber.

The final volume of the completely expanded and vulcanized roll will be of the order of 13½ times that of the corresponding rubber dough before impregnation. Although we have illustrated a particular composition and degree of expansion of the final roll of cellular rubber, it will be understood that variations thereof are feasible within the scope of our present invention.

Figure 4:
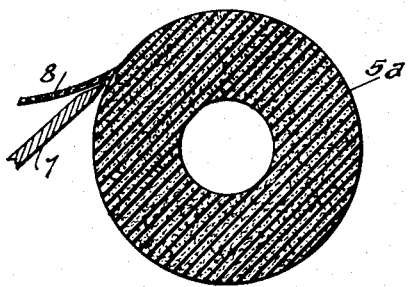
Figure 4 is a sectional schematic illustration of the paring or shaving stage in producing the rubber sheets.

Figure 4 is a sectional schematic illustration of the cutting or shaving stage of the finally cured cellular rubber roll 5a. A longitudinal cut is made on the surface of the roll 5a and a cutting blade 7 is inserted therein. The roll 5a is mounted on the mandrel and rotated. The thickness of the rubber sheet 8 shaved from roll 5a by blade 7 is adjustable in a well-known manner. The length of the sheet 8 is determined by the size of the rubber roll 5a. A homogeneous fine-celled rubber material with negligible skin thickness may be manufactured at a very low cost. If the material is cut sufficiently thin, it is useful for insulating and lining clothing or wearing apparel. It is also a cheap material useful for the insulation of automobile bodies. If the rubber roll is prepared in a hardened and dense form the resultant sheet material is suitable for automobile mats, undercarpeting and the like.

Sheets of vari-colored design may be formed in accordance with our present invention by utilizing elemental slabs of correspondingly different colors; for example, if alternate slabs 1a forming roll 5 (Figure 3) are colored black and white respectively, a sheet 8 illustrated in Figure 5 will result when shaved from the roll 5a. Parallel strips 9 and 10 are differently colored; in the present example, black and white respectively. It will be evident that more than two colors may be used to form correspondingly different striped effects.

If the individual slabs 1a are cut in half into portions 11 and 12 as illustrated in Figure 6 and arranged in alternating patterns before cementing to form the cylinder 5 of Figure 3, corresponding sections will be composed of, for example, a black segment 11 and a white segment 12 after final curing. The corresponding appearance of sheet 8a is illustrated in Figure 7. The longitudinal stripes 9' and 10' will contain alternate rectangles 11a and 12a colored black and white respectively. It will be understood that the cylindrical slabs 1a may be cut into more than two sections in building up the patterned structure described. The sheet and the coloring thereof will be homogeneous.

The individual slabs 1a may be cut transversely as illustrated in Figure 8 into corresponding sections 13 and 14. The cylinder 5 of Figure 3 is then cemented together with the sections 13 and 14 to build up the cylinder 5. It is to be understood that after the final curing stage the cemented edges of the plurality of sections comprising cylinder 5 are integrally welded so that the sheet 8a will be a homogeneous structure. Various designs and vari-colored patterns may be formed by different combinations of colors and different manners of building up the cylinder 5 with the colored segments before final heat treatment.

Figures 9 and 10 illustrate the two different designs which may be built up by properly aligning the sections 13 and 14 of Figure 8 in building up the cylinder sheets 5 of Figure 3 to sheets 8b and 8c.

Although we have described our invention in connection with gas expanded cellular rubber, it will be understood that the production of continuous sheets of ordinary rubber material is feasible and that the vari-colored designs of continuous sheets may be applied to the manufacture of any suitable plastic material and we do not intend to be limited except as set forth in the following claims.

We claim:

1. The method of manufacturing closed cell gas expanded rubber which comprises forming rubber into annular sections with central openings, said annular sections having a width thickness on the order of ¾ inch to one inch and an annular thickness on the order of two inches or less, impregnating the annular sections with an inert gas, assembling the sections and vulcanizing the assembled sections to form a closed cell gas expanded rubber cylinder.

2. The method of manufacturing cellular gas expanded rubber which comprises forming rubber into annular sections with central openings, said annular sections having a width thickness on the order of ¾ inch to one inch and an annular thickness on the order of two inches or less, impregnating the annular sections with an inert gas, assembling the sections and vulcanizing said assembled sections to form a homogeneous cellular gas expanded cylinder.

3. A method of manufacturing closed cell gas expanded rubber bodies which comprises forming rubber into relatively narrow sections of a width thickness on the order of three-quarters of an inch to one inch and an annular thickness on the order of two inches or less such as will permit the complete permeation thereof by means of an externally applied gas and the complete penetration thereof by means of externally applied heat; separating said sections before subjecting them to gas; gassing the separated sections with an externally applied gas; heating the separated sections; expanding the sections; combining the gassed sections; subjecting the combined gassed sections to sufficient heat to vulcanize said sections, and vulcanizing the closed cell gas expanded combined sections to form a laminated body.

4. A method of manufacturing closed cell gas expanded rubber bodies which comprises forming rubber into relatively narrow annular sections of a width thickness on the order of three-quarters of an inch to one inch and an annular thickness on the order of two inches or less such as will permit the complete permeation thereof by means of an externally applied gas and the complete penetration thereof by means of an externally applied heat; separating said annular sections before subjecting them to gas; gassing the separated annular sections with an externally applied gas; heating the separated annular sections; expanding the annular sections; combining the gassed annular sections; subjecting the combined gassed annular sections to sufficient heat to vulcanize said sections; vulcanizing the closed cell gas expanded combined annular sections to form a cylinder and continuously separating a peripheral sheet from the closed cell gas expanded rubber cylinder.

5. The method of manufacturing relatively large bodies of closed cell gas expanded rubber which comprises forming rubber into relatively small sections, gassing said small sections with an inert gas, assembling said gassed small sections together, and subjecting said assembled sections to heat to expand said assembled sections and vulcanize said assembled sections into a large body of closed cell gas expanded rubber.

6. The method of manufacturing relatively large bodies of closed cell gas expanded rubber which comprises forming rubber into relatively small sections, gassing said small sections with an inert gas, expanding said small sections, assembling said gassed small sections together, and subjecting said assembled sections to heat to further expand said assembled sections and vulcanize said assembled sections into a large body of closed cell gas expanded rubber.

7. The method of manufacturing relatively large bodies of closed cell gas expanded rubber which comprises forming rubber into relatively small sections, partially vulcanizing said small sections, gassing said small sections with an inert gas, expanding said small sections, assembling said gassed small sections together, and subjecting said assembled sections to heat to further expand said assembled sections and complete the vulcanization of said assembled sections, thereby forming a large body of closed cell gas expanded rubber being substantially uniformly permeated with closed cells.

8. The method of forming relatively thin sheets of substantially homogeneous closed cell gas expanded rubber which comprises forming relatively small annular sections of rubber, partially vulcanizing and gassing said relatively small annular sections, expanding said annular sections, assembling said annular sections to form a cylinder of partially vulcanized and expanded rubber, and heating said cylinder of assembled annular sections to further expand and completely vulcanize said annular sections into a substantially homogeneous closed cell gas expanded rubber cylinder, and continuously separating a peripheral sheet from said closed cell gas expanded rubber cylinder having homogeneously distributed closed cells throughout.

DUDLEY ROBERTS.
JAMES S. REID.